(12) United States Patent
Drake et al.

(10) Patent No.: US 12,335,306 B1
(45) Date of Patent: Jun. 17, 2025

(54) SYSTEM AND METHOD FOR SEARCHING FOR AND IDENTIFYING UNAUTHORIZED WEBSITES

(71) Applicant: Intercontinental Exchange Holdings, Inc., Atlanta, GA (US)

(72) Inventors: Tony Drake, Woodstock, GA (US); Bryant Renfroe, Atlanta, GA (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 0 days.

(21) Appl. No.: 18/809,806

(22) Filed: Aug. 20, 2024

(51) Int. Cl.
  *H04L 29/00* (2006.01)
  *H04L 9/40* (2022.01)
  *H04L 41/16* (2022.01)

(52) U.S. Cl.
  CPC .......... *H04L 63/1483* (2013.01); *H04L 41/16* (2013.01)

(58) Field of Classification Search
  CPC ............................ H04L 63/1483; H04L 41/16
  See application file for complete search history.

(56) References Cited

U.S. PATENT DOCUMENTS

| | | |
|---|---|---|
| 10,546,143 B1 | 1/2020 | Wesson |
| 11,171,916 B2 | 11/2021 | Huffner et al. |
| 11,201,850 B2 | 12/2021 | Nguyen et al. |
| 11,271,966 B2 | 3/2022 | Prakash et al. |
| 11,288,368 B1 | 3/2022 | Wesson |
| 11,301,560 B2 | 4/2022 | Prakash et al. |
| 11,356,479 B2 | 6/2022 | Prakash et al. |
| 2009/0216760 A1* | 8/2009 | Bennett ............... H04L 63/1441 707/999.005 |
| 2014/0331318 A1* | 11/2014 | Windsor ............... H04L 51/212 726/22 |
| 2019/0251252 A1* | 8/2019 | Prakash ............... H04L 63/1416 |
| 2021/0105302 A1 | 4/2021 | Prakash et al. |
| 2023/0118679 A1 | 4/2023 | Mayer et al. |
| 2023/0409399 A1* | 12/2023 | Chivers ................ G06F 9/5033 |
| 2024/0143753 A1* | 5/2024 | Zeng ................... G06F 21/6218 |

OTHER PUBLICATIONS

Wallace, Brian, "*Optimizing ssDeep for Use at Scale*," Virus Bulletin, Covering the Global Threat Landscape, Nov. 2015, pp. 1-9.
"Artificial Intelligence Like a Rock," Support Intelligence, Total Network Security Monitoring, website: http://www.support-intelligence.com, Feb. 6, 2025.

\* cited by examiner

*Primary Examiner* — Jeffrey C Pwu
*Assistant Examiner* — Helai Salehi
(74) *Attorney, Agent, or Firm* — DLA Piper LLP (US)

(57) ABSTRACT

Methods and systems or searching for and identifying unauthorized websites. A website detection system may receive website data from a data provider via a communications network and store the website data in a website data database. The website detection system may compare the website data to template data of known unauthorized sites to determine a level of similarity, the template data stored in a template data database. The website detection system may create a list of potentially unauthorized sites based on the comparing and store the list of potentially unauthorized sites and associated website data in a potentially unauthorized sites database. The website detection system may reviewing the list of potentially unauthorized sites and associated website data to identify one or more unauthorized websites on the list of potentially unauthorized and store the one or more unauthorized websites and associated website data in the template data database.

27 Claims, 11 Drawing Sheets

SYSTEM AND METHOD FOR SEARCHING FOR AND IDENTIFYING UNAUTHORIZED WEBSITES

TECHNICAL FIELD

The present disclosure generally relates to searching for and identifying unauthorized websites and, in particular, to systems and methods that use one or more characteristics of template websites that are known to be unauthorized and include one or more categories of undesirable content to identify additional previously unknown websites that include content (e.g., text, graphics, logos, designs, etc.) that are one or more of identical, substantially similar, or similar to the template website.

BACKGROUND

Unauthorized websites are used for a variety of nefarious purposes. These websites are created with intent to make users believe they are using a legitimate site of a known entity, deceiving the users into providing sensitive personal or financial information or downloading potentially dangerous files. In some cases, an unauthorized website may have an address similar to that of a popular, trusted website, such that a user is directed to the unauthorized website if a user mistypes the address of the popular website into a browser. The unauthorized website may be formatted to appear like the legitimate site (e.g., it may use the same or similar layout, language, images, logos, etc.) and may have been built using the same or similar underlying code. Because the harm that these unauthorized websites or their operators can cause to a user may be severe, it is desirable to search for and identify these unauthorized websites so that they can be taken down.

SUMMARY

Aspects of the present disclosure relate to methods and systems for searching for and identifying unauthorized websites. A website detection system may receive website data from a data provider via a communications network and store the website data in a website data database. The website detection system may compare the website data to template data of known unauthorized sites to determine a level of similarity, the template data stored in a template data database. The website detection system may create a list of potentially unauthorized sites based on the comparing and store the list of potentially unauthorized sites and associated website data in a potentially unauthorized sites database. The website detection system may review the list of potentially unauthorized sites and associated website data to identify one or more unauthorized websites on the list of potentially unauthorized and store the one or more unauthorized websites and associated website data in the template data database.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

Figure 1A:
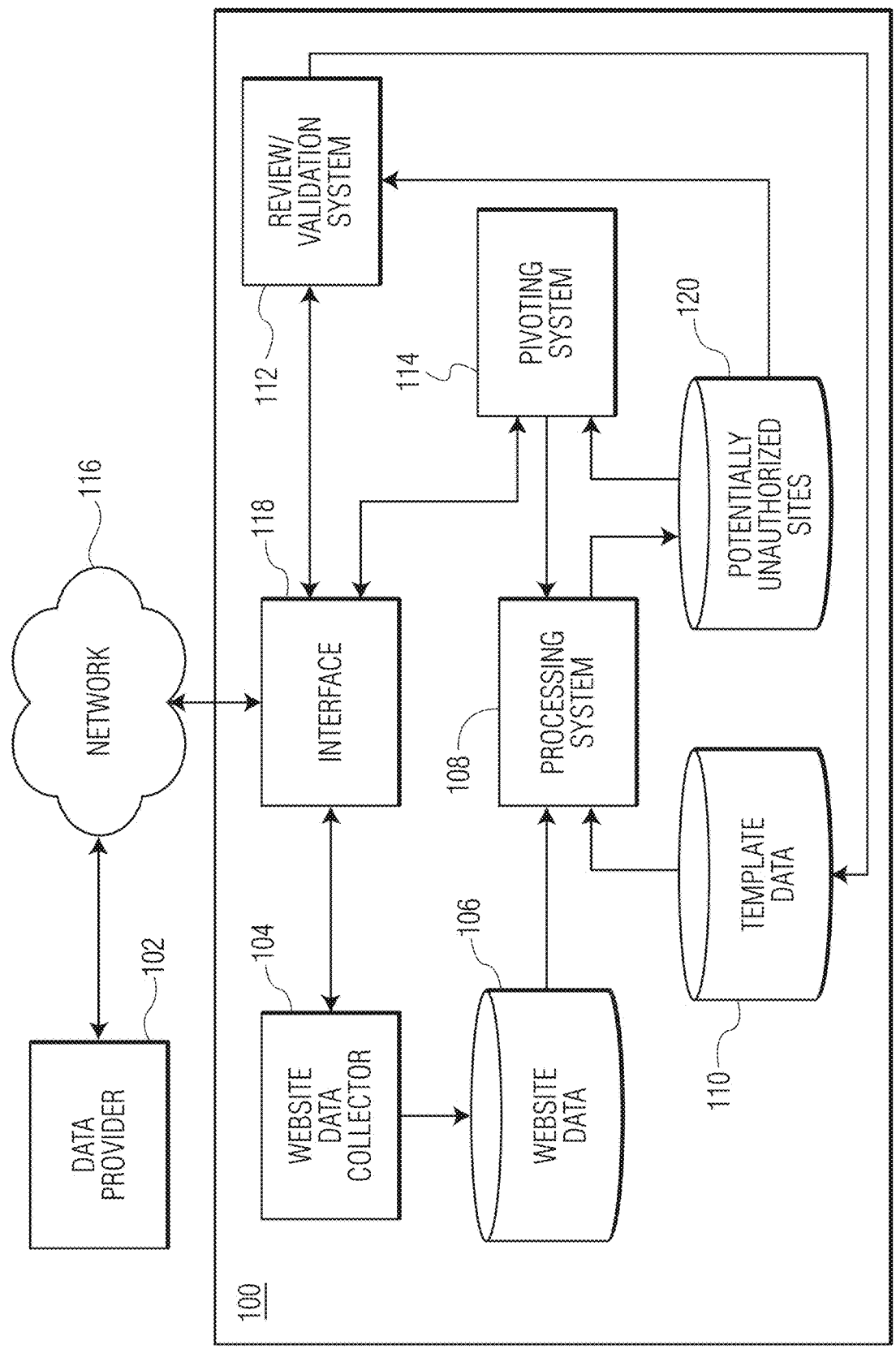
FIG. 1A is a functional block diagram of an example of a website detection system for searching for and identifying unauthorized websites based on a similarity of the content of the websites and the underlying source code, according to an aspect of the present disclosure.

The figures are for purposes of illustrating example embodiments, but it is understood that the present disclosure is not limited to the arrangements and instrumentality shown in the drawings.

DETAILED DESCRIPTION

As noted above, unauthorized websites are problematic, including in their usage to deceive users into fraud and/or malicious cyberattacks. Another problem with unauthorized websites is that they may impersonate legitimate websites (such as websites of legitimate brands) and divert customers and sales to counterfeit products (as well as, in some examples, stealing customer data).

A number of technical characteristics inherent to websites (e.g., how they are created, structured, and maintained) has led to a rampant spread of unauthorized websites, a problem unique to the Internet. Owners/organizers of unauthorized websites change website templates (including source code) regularly, use non-branded domains, and hide behind obfuscations, redirections, and barriers. It has become extremely difficult to identify potential unauthorized websites on the Internet, not the least of which is due to the sheer number of domains and the ability to alter underlying source code-even minimally-such that it is not an exact 1:1 match to avoid detection.

These tactics make it very difficult to search for and identify unauthorized websites, especially when only domain names are used for searching. For example, in a type of domain name attack referred to as typosquatting, a domain name that looks similar to a more established domain name may be used to deceive or fool a user. A typosquatting domain name may be a variant of the more established domain name. For example, a slight change such as a capital case of "I" or "1" may be used instead of a lower case "I"; a hyphen may be added; a small typo may be introduced; an extra character may be omitted or added; or the number "0" may be used instead of a lower case "o"—the variations can be limitless.

Further, domain names with related terms (e.g., terms that may be related to the brand name), may include only an approximate match to the brand name and manage to evade detection, while still appearing to be familiar to potential victims. The process becomes even more difficult and complicated when a brand name is something short, as legitimate domains that are unrelated to the brand but whose name still include a match to the brand name may be encountered. For example, a brand name such as ING™ may be short. Any domain name that includes a present participle (e.g., "going", "laughing", "eating") would also include an exact match for "ing."

Accordingly, there is a need for a way to search for and identify unauthorized websites based on a similarity of the content of the websites and the underlying source code rather than just the domain name. The systems and method described herein may use one or more characteristics of template websites that are known to be unauthorized and include one or more categories of undesirable content (e.g., impersonations, illicit copies, potential infringements, counterfeits, malware, fraud, etc.) to identify additional previously unknown websites that are substantially similar to the template website. By analyzing and comparing string patterns and unique source code entries from known sites to find unknown sites with the same or similar templates, the systems and methods described herein may identify unauthorized sites by one or more of barrier, stop page, and other characteristics in their code.

Figure 1B:
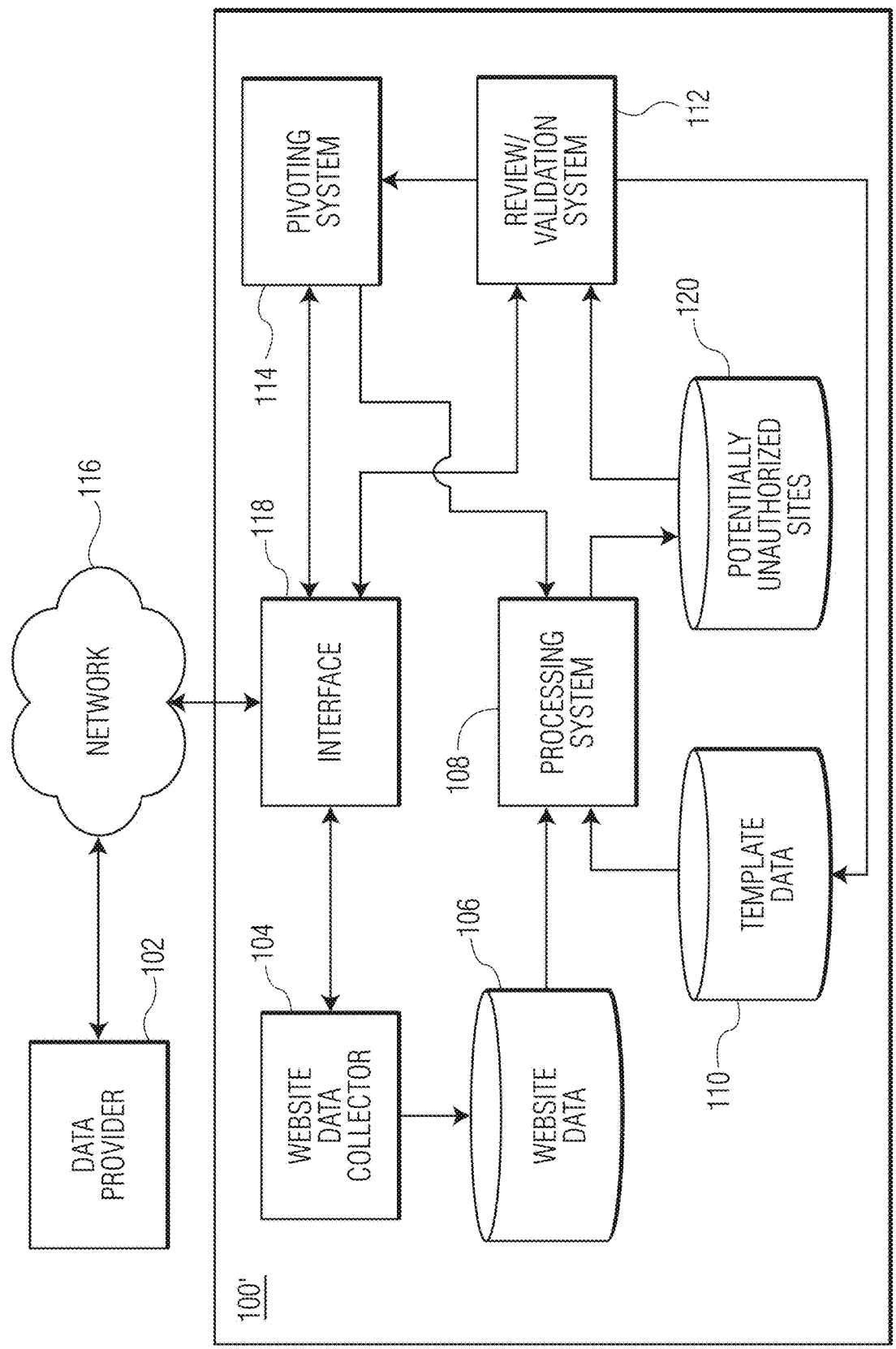
FIG. 1B is a functional block diagram of another example of a website detection system for searching for and identifying unauthorized websites based on a similarity of the content of the websites and the underlying source code, according to an aspect of the present disclosure.

Referring now to FIGS. 1A-1B, examples of website detection systems 100 and 100' for searching for and identifying unauthorized websites based on a similarity of the content of the websites and the underlying source code is shown. The website detection systems 100 and 100' 100 may include a communications interface 118 that allows for communication with a network 116. The network 116 may be one or more of a local area network (LAN), wide-area networks (WAN), metropolitan area networks (MAN), and/or the Internet. The website detection systems 100 and 100' 100 may communicate with a data provider 102 via the network 116. The data provider 102 may include one or more sources of registered domains.

The system may include a website data collector 104 configured to collect hypertext markup language (HTML) source code from websites on domains retrieved from the data provider 102. The HTML source code may be stored in a website data database 106. Website data collector 104 is described further below with respect to FIG. 2. A processing system 108 may perform one or more operations to process the HTML source code and compare one or more characteristics of the HTML source code to one or more characteristics of HTML source code from one or more known unauthorized websites stored in a template data database 110. Based on the comparisons, the processing system 108 may identify potential unauthorized sites. A list of potentially unauthorized sites and the associated website data may be stored in a potentially unauthorized sites database 120. Processing system 108 is described further below with respect to FIG. 3.

A review/validation system 112 may perform one or more operations to review the potential unauthorized sites and confirm whether they are actually unauthorized. Review/validation system 112 is described further below with respect to FIG. 4. A pivoting system 114 may be used to search for any additional websites (e.g., websites that share the same internet protocol (IP) address) that may also include the one or more characteristics identified by the processing system 108 in order to locate additional unauthorized sites.

The pivoting system 114 may take the list of potentially unauthorized sites from the potentially unauthorized sites database 120 (FIG. 1A) or the websites confirmed to be unauthorized by the review/validation system 112 (FIG. 1B) and use the information to pivot to other data points (e.g., websites on the same IP, sites with the same favicon, sites with the body SSDeep, etc.) to locate additionally potentially unauthorized websites. For example, the pivoting system 114 may determine whether a canonical name (CNAME) exists. A CNAME is a type of DNS record that maps an alias name to a true or canonical domain name. If CNAME records exist, the pivoting system 114 may walk the DNS CNAME tree to identify any additional sites using the same CNAME. If any additional sites are identified by the pivoting system 114, they may be sent to the processing system 108 for further processing.

It should be noted that in the website detection system 100 of FIG. 1A, the pivoting system 114 may be utilized after the processing system 108 performs the one or more operations to identify the potential unauthorized sites and may retrieve the potentially unauthorized sites from the potentially unauthorized sites database 120. In the website detection system 100' of FIG. 1B, the pivoting system 114 may be used to locate additional sites after the one or more operations of the review/validation system 112 have been performed. In general, the website detection systems 100 and 100' are similar, except for the positioning of the pivoting system 114 with respect to review/validation system 112.

Figure 2:
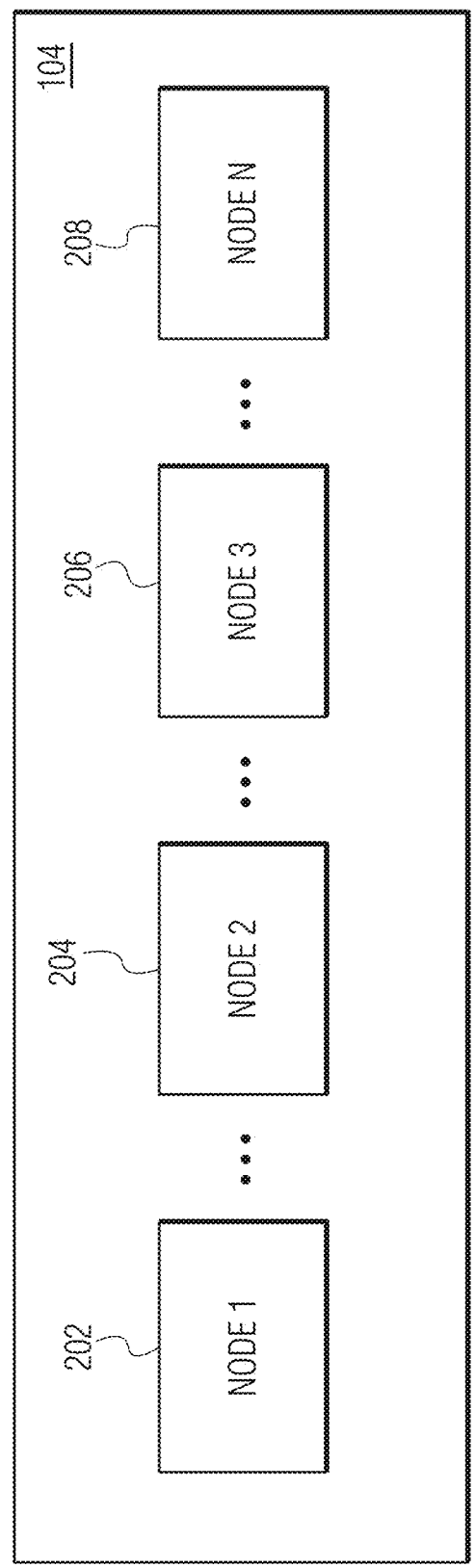
FIG. 2 is a functional block diagram of a website data collector, according to an aspect of the present disclosure.

Referring now to FIG. 2, a functional block diagram of the website data collector 104 is shown. The website data collector 104 may pull website data from the data provider 102 and extract HTML source code from the retrieved domains. The data provided may be any source of currently/newly registered domains. For example, the data provider 102 may be the Centralized Zone Data Service (CZDS) hosted by the Internet Corporation for Assigned Names and Numbers (ICANN), which is an online portal where any interested party can request access to zone files provided by participating generic top-level domains (gTLDs). Each top-level domain (TLD) is maintained by a registry operator, who also manages a publicly available list of second level domains (SLDs) and the details needed to resolve those domain names to Internet Protocol (IP) addresses. The registry operator's zone data contains the mapping of domain names, associated name server names, and IP addresses for those name servers. These details are updated by the registry operator for its respective TLDs whenever information changes or a domain name is added or removed. Each registry operator keeps its zone data in a text file called the zone file which is updated once every 24 hours. The data provider 102 may also be any open source or licensed program that can pull certificates on a regularly basis or as they are issued.

After the websites are received from the data provider 102, the website data collector 104 may combine all websites from each source serving as the data provider 102 into a single list of unique domains. The website data collector 104 may split the list into an N number of portions (where N is an integer greater than or equal to 1) corresponding to a number of nodes to increase the processing efficiency of such a large amount of data. The website data collector 104 may nave any number of nodes, for example, node 1 202, node 2 204, node 3 206, . . . , node N 208. Each node may be a virtual machine (e.g., windows or Linux based). For example, each node may be a Linux virtual machine hosted by a cloud computing service configured for high performance disk throughput.

Each of node 1 202, node 2 204, node 3 206, . . . , node N may generate any number of third level domain combinations as is necessary to identify unauthorized sites. Each of node 1 202, node 2 204, node 3 206, . . . , node N 208 may utilize any number of permutations of the domain and URL string. A high-performance parallel http/https data transfer application may retrieve HTML source code from all domains and store the HTML source code in a website database 106.

In an example, each of node 1 202, node 2 204, node 3 206, . . . , node N 208 may generate multiple configuration files for the high-performance parallel http/https data transfer application (e.g., cURL). Each of node 1 202, node 2 204, node 3 206, . . . , node N 208 may utilize multiple URL and protocol (e.g., http and https) combinations to ensure that all online sites are retrieved. Each of node 1 202, node 2 204, node 3 206, . . . , node N 208 may distribute the configuration files across the filesystem in a series of directories and generate unique output paths that distribute the output files across multiple directories on the filesystem to improve the performance of the searching step. Each of node 1 202, node 2 204, node 3 206, . . . node N 208 may generate additional config files for sites using specific unique URL patterns for particular malicious or unauthorized site templates for use by the high-performance parallel http/https data transfer application.

The website data collector 104 may create a list of all config files generated by each of node 1 202, node 2 204, node 3 206, . . . , node N 208. Using the list of config files, and a utility that allows for execution of shell scripts or commands in parallel (e.g., the GNU Parallel command) the website data collector 104 may retrieve the HTML source code from all domains using the client-side URL transfer library program and each of the configuration files. The HTML source code may be stored as website data in the website data database 106.

When all processing (see below) is complete, the website data collector 104 may reformat, partition and re-run all steps above. Because of the volume of data, this procedure may consume fewer computing resources and may be more efficient than purging/deleting the old data.

Figure 3:
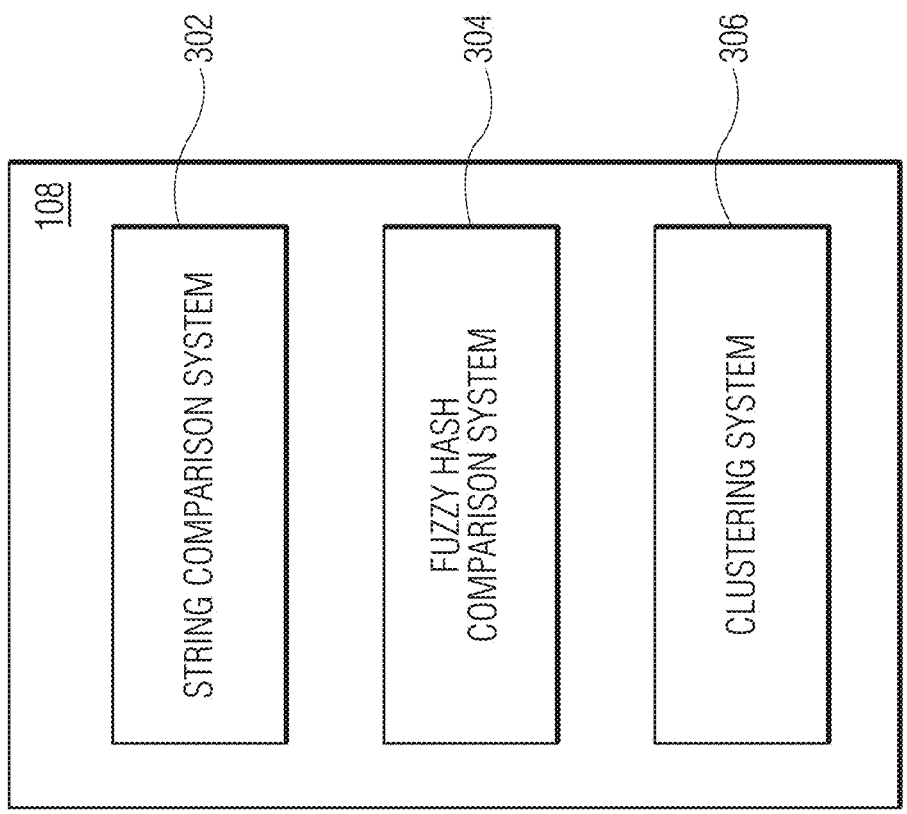
FIG. 3 is a functional block diagram of a processing system, according to an aspect of the present disclosure.

Referring now to FIG. 3, a functional block diagram of the processing system 108 is shown. The processing system 108 may be run on one or more of node 1 202, node 2 204, node 3 206, . . . , node N 208 (FIG. 2) as the website data collector 104 or may be run on one or more other nodes. The processing system 108 may include one or more of a string comparison system 302, a fuzzy hash comparison system 304, and a clustering system 306, each of which may be used to analyze/process the website data stored in the website data database 106. The string comparison system 302, fuzzy hash comparison system 304, and clustering system 306 may be used in a sequential manner to process the website data or they may be used to process the website data concurrently.

The string comparison system 302 may use one or more data comparison tools, for example, ripgrep or YARA, to compare strings found within the website data to strings from known unauthorized sites, which may be stored as template data in the template data database 110. For example, the website data may be searched for any string that indicates an unauthorized site including the HTML title, or other unique strings identified in the template data.

Ripgrep is a command line tool that searches files for patterns defined by a user. Ripgrep behaves as if reading each file line by line. If a line matches the pattern provided to ripgrep, then that line will be printed. If a line does not match the pattern, then the line is not printed.

YARA is a rules-based technique based on pattern matching developed for the research community to discover and classify malware. It offers a simple and effective way of creating customized rules (called YARA rules), comprising descriptions of aimed malware dependent on strings or byte sequences discovered in it, which are used to find malevolent files or processes. YARA syntaxes and semantics are very similar to the C programming language. It can be used through a command-line interface or Python scripts (e.g., with a YARA-python extension). YARA rules are adaptable and can be used on all main (e.g., well-known) operating systems. Any website that is determined to have strings that match a known unauthorized site may be added to a list of potentially unauthorized sites and the associated website data may be stored in a potentially unauthorized sites database 120. In an example, the potentially unauthorized sites database 120 may be a separate database system than the website data database 106. In another example, the potentially unauthorized sites database 120 may be a separate partition of the website data database 106.

Standard YARA rules may include certain strings/attributes that are unique. Thus, standard YARA rules may not be effective in cases where those exact strings/attributes of the rule(s) may not be present; due to the modifications to websites and the underlying source code described above. Increasing the number of strings/attributes or rules may not be effective for triaging as it can cause redundancy, slow down the operation and increase computational overheads. Furthermore, writing sophisticated YARA rules may require sufficient knowledge of advanced aspects of YARA rules, which demands expertise, experience and significant time.

Using fuzzy hashing to augment YARA rules is a fast and resource-optimized method that may produce improved triaging results in comparison to YARA rules alone. Fuzzy hashing is more effective in cases of structural similarity of source code (even if the specific strings/attributes are not present). Using fuzzy hashing along with YARA may thus increase the triaging performance of the fused YARA rules by matching the structural similarity (rather than selective strings/attributes). Moreover, using fuzzy hashing along with YARA may not affect the efficiency and overheads, because fuzzy hashing is compact and fast. Additionally, using fuzzy hashing along with YARA may provide a degree of similarity to the fuzzy characteristic of fuzzy hashing which is not possible with YARA alone.

The fuzzy hash comparison system 304 may generate SSDeep hashes for files within the website data and then use the one or more data comparison tools (e.g., ripgrep or YARA) to compare the SSDeep hashes to SSDeep hashes of the template data. SSDeep is a fuzzy hashing algorithm that employs a similarity digest in order to determine whether the hashes that represent two files have similarities. For instance, if a single byte of a file is modified, the SSDeep hashes of the original file and the modified file may be considered highly similar. SSDeep scores range from zero (no similarity or negligible similarity) to 100 (very similar, if not an exact match). SSDeep works by computing a fuzzy hash of each piece of data supplied to it (string/file/etc.).

More specifically, SSDeep may split a file into several blocks depending on the data given in the file. These blocks and their endpoints may be created by employing an Adler32 function involved in a rolling hash method. Subsequently, a hash may be created for each block. Finally hashes of all the blocks may be concatenated to obtain the fuzzy hash of that file.

Most implementations of SSDeep refer to this computing of the fuzzy hash as "compute." The output of this compute function is an SSDeep hash, which may look like the following:

768:
v7XINhXznVJ8CC1rBXdo0zekXUd3CdPJxB7mNm
DZKUKMKZQbFTiKKAZTy:ShT8C+
fuioHq1KEFoAU.

Once hashes are computed for more than one input, a comparison method (generally referred to in implementations as "compare") may be used to compare the two hashes. This similarity comparison may be done completely independently of the files the hashes are based on. This may allow for simple high-level comparisons without the need to compare each file byte by byte. The fuzzy hash comparison system 304 may compare the fuzzy hashes generated from the website data stored in the website data database 106 to fuzzy hashes generated from known unauthorized sites, which may be stored as template data in the template data database 110.

In an example, a Python script may be used to take groups of similar SSDeeps in the list of SSDeeps of the template data and find the longest substring common to the SSdeeps in the group. The common strings may be added to the SSDeep list as a fuzzy match to find sites that have changed slightly, or to exclude sites that are false positives. A common string algorithm may be run to compare every string to itself. The original lines from the list of SSDeeps may be removed since each string is compared to itself. It may then be determined how many full strings each common string covers. In an example, the common strings with the most hits may be whitelisted or blacklisted to avoid false positives and reduce the amount of data to be processed/reviewed.

To compare the SSDeeps of the website data to the SSDeeps of the template data, one or more Python scripts may be used to calculate the Levenshtein distance between each SSDeep of the website data and any SSDeep of the template data, and identify any SSDeeps of the website data that have a minimal distance. This may be repeated for values up to a predetermined threshold (e.g., degree of similarity). Any website that is determined to be above the predetermined threshold may be added to the list of potentially unauthorized sites and the associated website data may be stored in the potentially unauthorized sites database 120. In an example, the list of potentially unauthorized sites may be grouped by SSDeep to facilitate review/validation.

The clustering system 306 may use one or more visual processing algorithms to find and cluster similar files. For example, the clustering system 306 may transform the website data using a space-filling curve, down-sample the transformed result to obtain a "locus", and then compare that locus to any loci of the template data generated by the same method to determine a similarity. This may be repeated for values up to a predetermined threshold (e.g., degree of similarity). Any website that is determined to be above the predetermined threshold may be added to the list of potentially unauthorized sites and the associated website data may be stored in the potentially unauthorized sites database 120.

Figure 4:
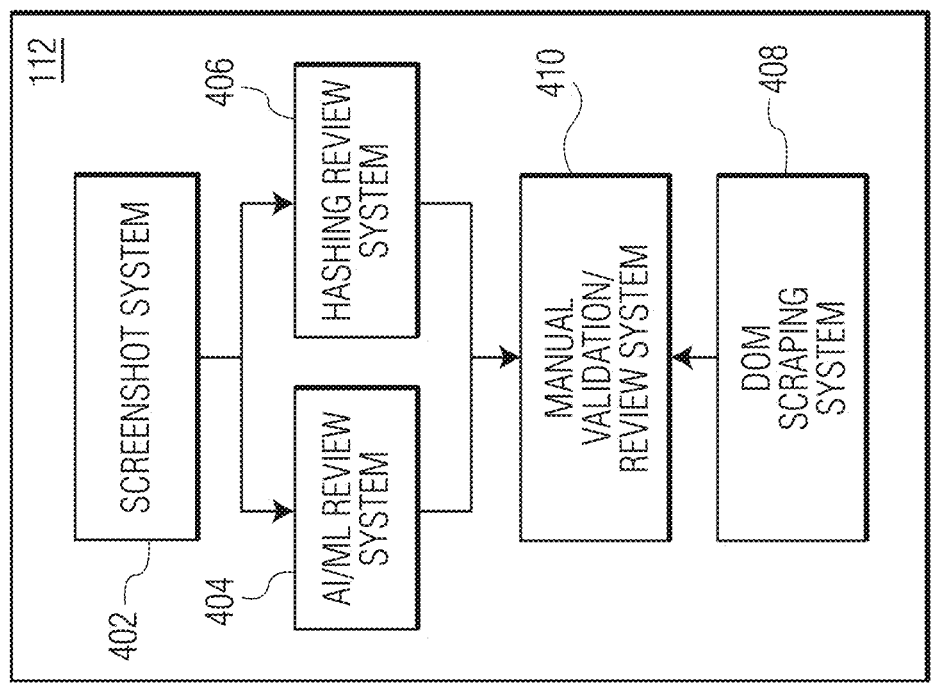
FIG. 4 is a functional block diagram of a review/validation system, according to an aspect of the present disclosure.

Referring now to FIG. 4, a functional block diagram of the review/validation system 112 is shown. The review/validation system 112 may include a screenshot system 402, an artificial intelligence/machine learning (AI/ML) review system 404, a hashing review system 406, a Document Object Model (DOM) scraping system 408, and a manual validation/review system 410. The screenshot system 402 may identify the potentially unauthorized websites on the list of potentially unauthorized websites stored in the potentially unauthorized sites database 120 and obtain one or more screenshots of the website as it is displayed in a browser. The screenshot system 402 may do this by accessing the potentially unauthorized websites via the communications interface 118 and using one or more tools/methods such as (without being limited to) Chrome screenshot, Mozilla Firefox screenshot, pageres-cli, AWS lamda function, and third-party SaaS tools. In an example, the screenshots may include a full screen view and a viewport view (e.g., what is shown on a single monitor in a web browser).

Once the screenshots are obtained, they may be reviewed by one or more of the AI/ML review system 404, the hashing review system 406, and the manual validation/review system 410 (and which review may be performed in a sequential manner or concurrently). In an example, one or more of the AI/ML review system 404 and the hashing review system 406 may be used to identify potentially unauthorized sites for the manual validation/review system 410.

Figure 5:
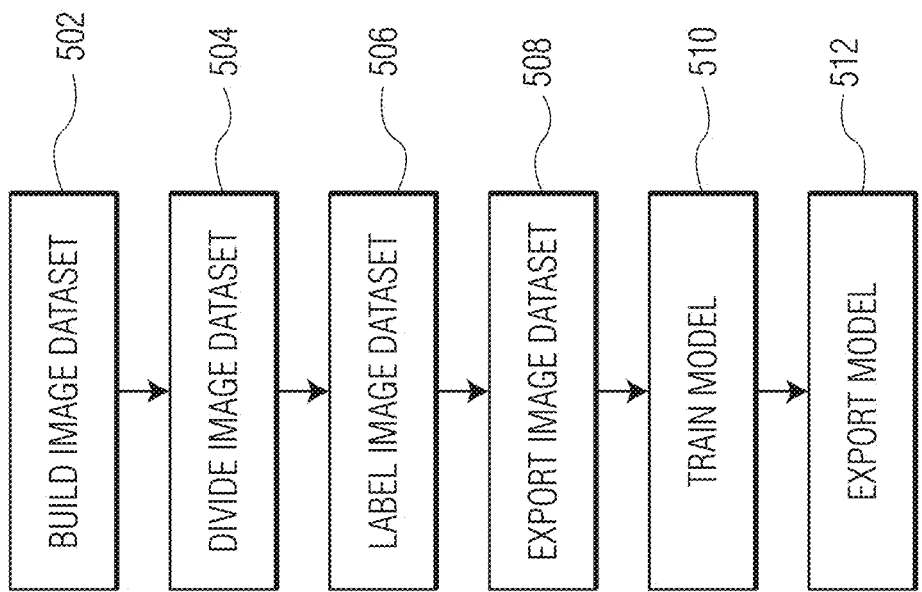
FIG. 5 is a flow chart illustrating an example of how one or more models of an artificial intelligence/machine learning (AI/ML) review system may be generated, according to an aspect of the present disclosure.

Referring now to FIG. 5, a flow chart is shown illustrating how one or more models of the AI/ML review system 404 may be generated. At step 502, an image dataset may be built. The image dataset may include screenshots of known unauthorized websites included in the template data.

At step 504, the image dataset may be divided into one or more categories, such as training images (e.g., 80%), testing images (e.g., 10%), and validation images (e.g., 10%), although other percentages are contemplated. The image dataset may be divided in a manner such that each category of the one or more categories includes a substantially equal proportion of representative images. At step 506, the images may be labeled and annotated with a boundary box around an item of interest (e.g., a logo). In an example, the labeling and annotation may be done using a labeling tool such as CVAT.

At step 508, the image dataset may be exported to a format compatible with an object detection model, such as You Only Look Once (YOLO) format. A yaml configuration file may be used to instruct the YOLO model as to which images are for training, testing, and validation. At step 510, the model may be trained. In an example, the YOLO model may be customized by training on the training images and then validating the performance using the validation images. The testing images may be used to evaluate model performance. At step 512, the model may be exported to a particular format, such as the Open Neural Network Exchange (ONNX) format.

Once the model is imported, the AI/ML review system 404 may run the model to analyze the one or more screenshots. The AI/ML review system 404 may generate a json summary and/or image of a screenshot with a label and boundary box around the detected item of interest, which may be sent to the manual validation/review system 410 for further review.

The hashing review system 406 may generate a hash (e.g., sha1, SSDeep, phash, dhash, avg_hash, etc.) and/or cluster for each of the one or more screenshots. If the website is known to be unauthorized, the hashing review system 406 may compare the hashed one or more screenshots to a hash of a previous one or more screenshots of the website that is known to be unauthorized. If the comparison determines that the hashed one or more screenshots are the same or similar to the previous one or more screenshots, the template data may be updated in the template data database 110. If the comparison determines that the hashed one or more screenshots are different than the previous one or more screenshots, the one or more screenshots may be sent to the manual validation/review system 410 for further review.

The DOM scraping system 408 may parse text generated by JavaScript (e.g., when pulling information from backend databases) for strings indicating unauthorized content. DOM is the data representation of objects that comprise the structure and content of a website. If a website is determined to include unauthorized strings in the DOM, it may be sent to the manual validation/review system 410 for further review.

The manual validation/review system 410 may utilize one or more analysts to review the outputs of one or more of the AI/ML review system 404 and the hashing review system 406. In an example, an analyst may receive the one or more screenshots (which may be labeled and annotated by the AI/ML review system 404) and the associated URL in a portal. The analyst may review the one or more screenshots and tag them as either unauthorized or having no issues. Screenshots that are tagged as unauthorized may be sent to a provider for takedown. Screenshots that are tagged as having no issues may be whitelisted, so they are not continuously reviewed. In an example, the analyst may further specify that a screenshot includes unauthorized content from one or more partners. In this case, the screenshot may be stored and then disseminated to the respective one or more partners. For any website that is tagged as unauthorized and/or included unauthorized content from one or more partners, the associated website data, including the SSDeeps, may be stored as template data in the template data database 110.

Figure 6:
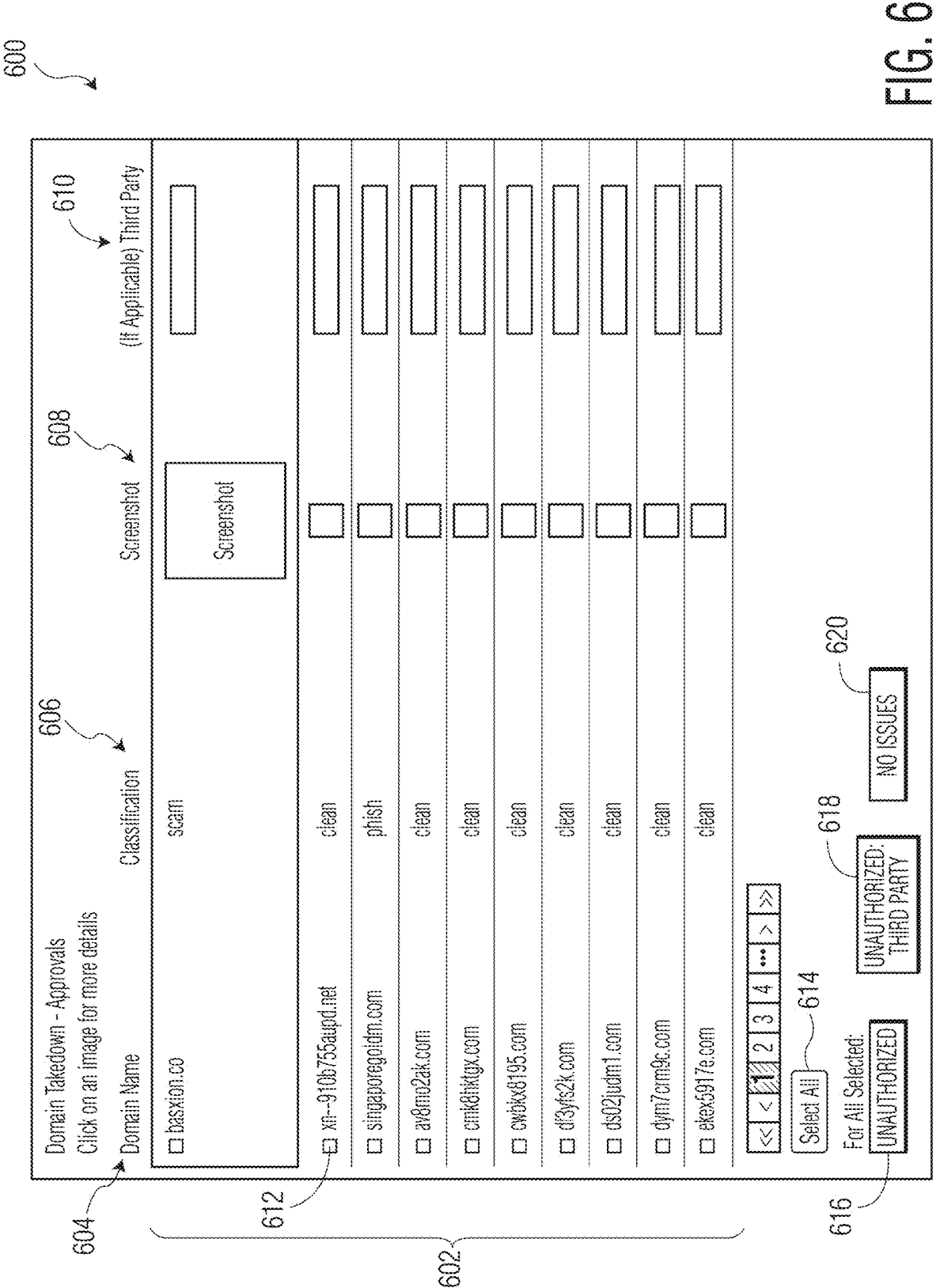
FIG. 6 is a screenshot of an example review portal, according to an aspect of the present disclosure.

Referring now to FIG. 6, a screenshot is shown of an example interactive review portal 600, which may be part of an interactive graphical user interface (GUI) generated by the manual validation/review system 410. The interactive review portal 600 may include a list 602 of websites identified by one or more of the AI/ML review system 404, the hashing review system 406, and the DOM scraping system 408. The list 602 may include a domain name 604, an initial classification 606 of the website, a representative screenshot 608, and a third party field 610. The initial classification 606 may be provided by a third party and/or generated by one or more of the AI/ML review system 404, the hashing review system 406, and the DOM scraping system 408.

The list 602 may include a checkbox 612 for each item. The checkbox 612 may allow a user to select one or more items in the list 602. The list 602 may also include a select all button 614 that allows a user to select each item in the list 602. Once the one or more items are selected, the user may be able to tag them as unauthorized by selecting an "unauthorized" button 616, as unauthorized content of a third party by selecting an "unauthorized: third party" button 618, or not having issues by selecting a "no issues" button 620. Third party field 610 may allow the user to input a name of the third party.

Figure 7:
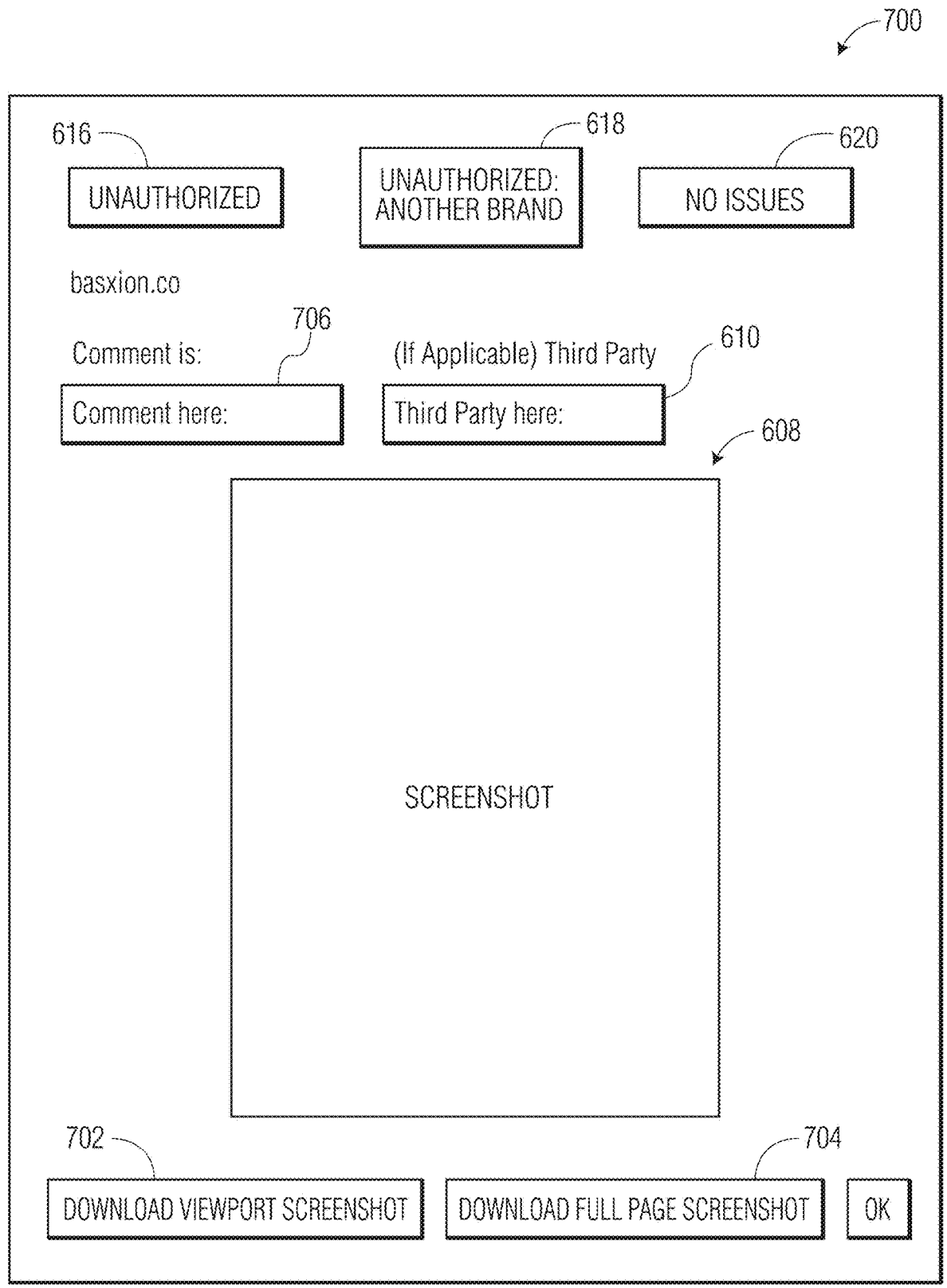
FIG. 7 is a screenshot of an example review screen, according to an aspect of the present disclosure.

Referring now to FIG. 7, a screenshot is shown of an example review screen 700, which may be part of the interactive GUI generated by the manual validation/review system 410. The review screen 700 may be displayed when a user selects a particular item from the list 602 shown in the review portal 600.

The review screen 700 may include the domain name 604 of the selected website and an enlarged version of the representative screenshot 608. The review screen 700 may also include one or more buttons that allow a user to download copies of the one or more screenshots captured by the screenshot system 402. For example, the review screen 700 may include a download viewport screenshot button 702 and a download full page screenshot button 704. The review screen 700 may allow the user to tag the selected website as unauthorized by selecting the "unauthorized" button 616, as unauthorized content of third party by selecting the "unauthorized: third party" button 618, or not having issues by selecting the "no issues" button 620. The review screen 700 may also include one or more fields that allow a user to input comments/information. For example, the review screen 700 may include a comment field 706 and the third party field 610.

It should be understood that FIGS. 6 and 7 represent a non-limiting example user interface, and that a differing interface configured in accordance with this disclosure may be provided for presentation and interaction with potentially unauthorized websites.

Figure 8:
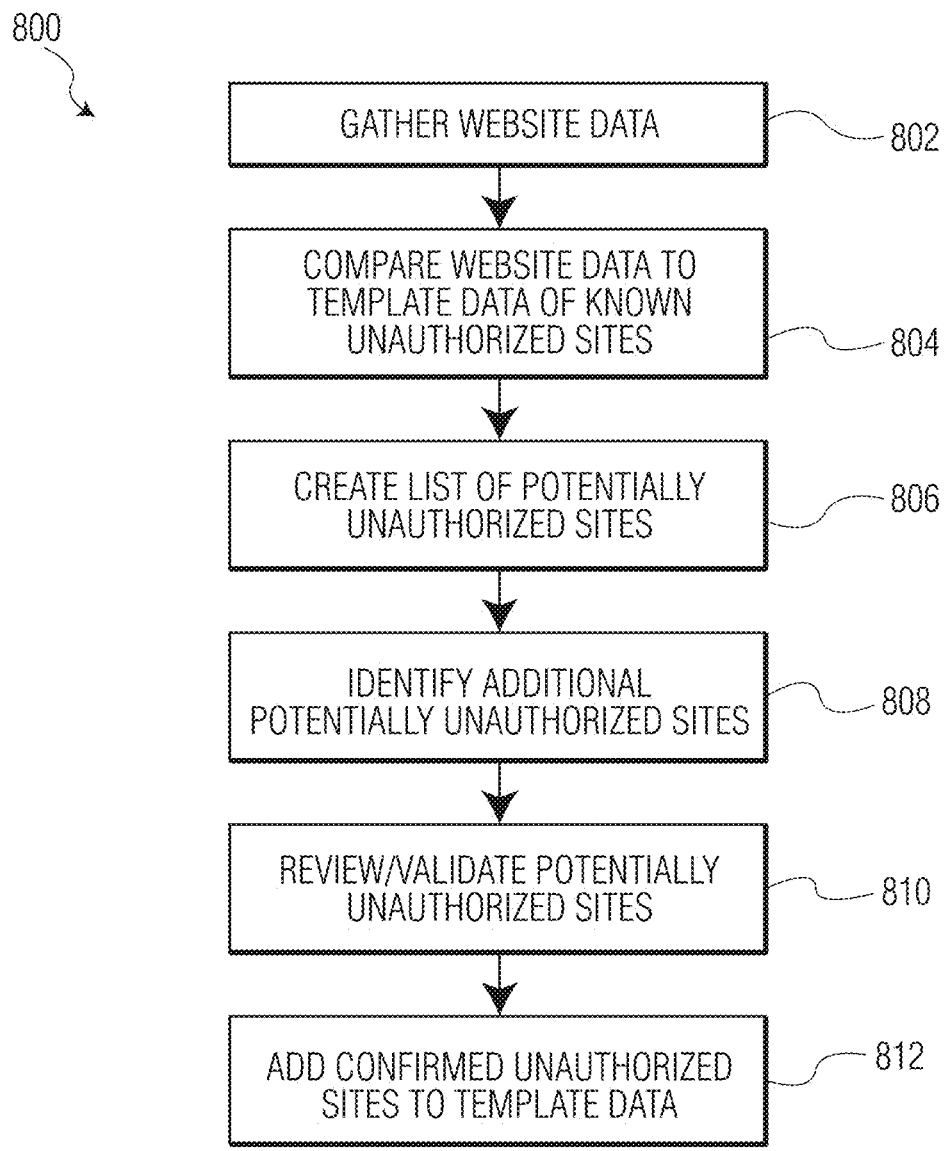
FIG. 8 is a flowchart illustrating an example method of searching for and identifying unauthorized websites based on a similarity of the content of the websites and the underlying source code, according to an aspect of the present disclosure.

Referring now to FIG. 8, a flowchart illustrating an example method 800 of searching for and identifying unauthorized websites based on a similarity of the content of the websites and the underlying source code is shown. The method 800 may be used by the website detection system 100 shown in FIG. 1A and may incorporate the functionalities described above.

At step 802, the website data collector 104 may gather website data (e.g., from data provider 102). The website data may be stored in the website data database 106. At step 804, the processing system 108 may compare the website data to template data of known unauthorized sites. The template data may be stored in the template data database 110. At step 806, the processing system 108 may create a list of potentially unauthorized sites and store the list as well as the associated website data in the potentially unauthorized sites database 120.

At step 808, the pivoting system 114 may use the list of potentially unauthorized sites and the associated website data to identify additional potentially unauthorized sites. At step 810, the review/validation system 112 may be used to review the list of potentially unauthorized sites and the associated website data to determine whether the website is unauthorized. At step 812, any websites that are confirmed to be unauthorized and the associated website data may be added to the template data in the template data database 110.

Figure 9:
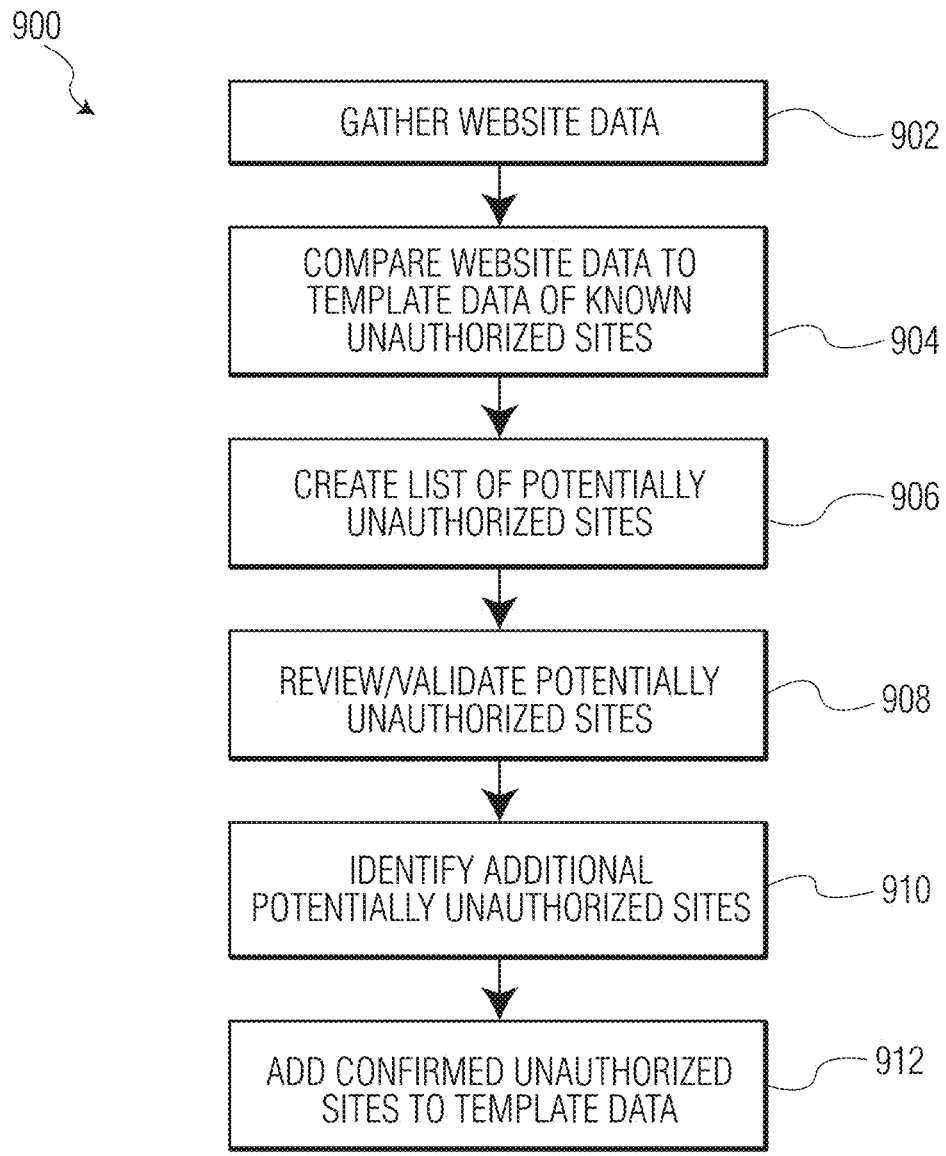
FIG. 9 is a flowchart illustrating another example method of searching for and identifying unauthorized websites based on a similarity of the content of the websites and the underlying source code, according to an aspect of the present disclosure.

Referring now to FIG. 9, a flowchart illustrating an example method 900 of searching for and identifying unauthorized websites based on a similarity of the content of the websites and the underlying source code is shown. The method 900 may be used by the website detection system 100' shown in FIG. 1B and may incorporate the functionalities described above.

At step 902, the website data collector 104 may gather website data (e.g., from data provider 102). The website data may be stored in the website data database 106. At step 904, the processing system 108 may compare the website data to template data of known unauthorized sites. The template data may be stored in the template data database 110. At step 906, the processing system 108 may create a list of potentially unauthorized sites and store the list as well as the associated website data in the potentially unauthorized sites database 120.

At step 908, the review/validation system 112 may be used to review the list of potentially unauthorized sites and the associated website data to determine whether the website is unauthorized. At step 910, the pivoting system 114 may use the list of potentially unauthorized sites and the associated website data to identify additional potentially unauthorized sites. At step 912, any websites that are confirmed to be unauthorized and the associated website data may be added to the template data in the template data database 110.

The systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information/transaction system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 10:
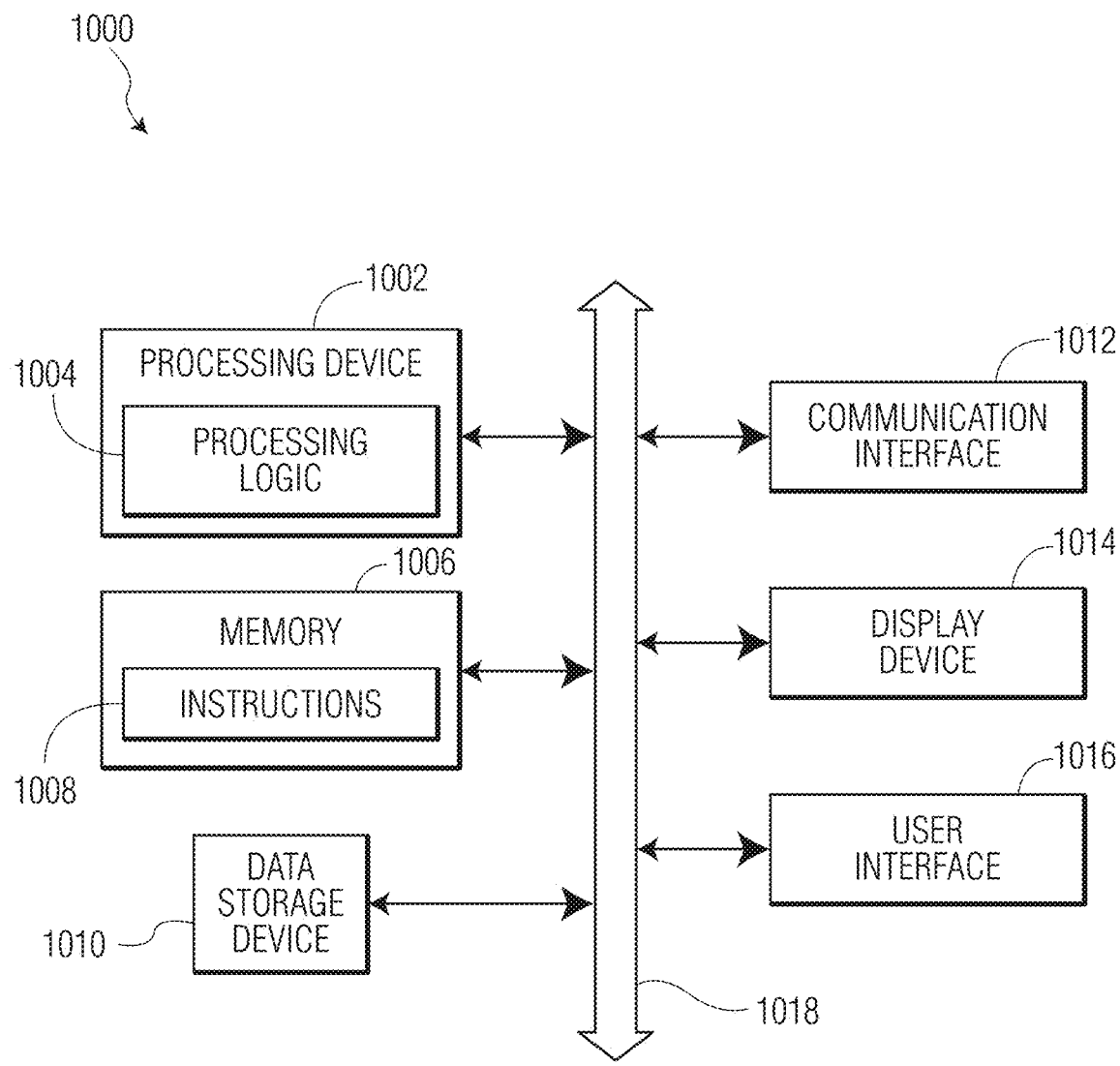
FIG. 10 is a functional block diagram of an example computer system, according to an aspect of the present disclosure.

Referring now to FIG. 10, a functional block diagram of a machine in the example form of computer system 1000 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, one or more of components of the website detection systems 100 and 100' may be implemented by a specialized machine, particularly programmed to perform certain functions, such as the example machine shown in FIG. 10 (or a combination of two or more of such machines).

The example computer system 1000 may include processing device 1002, memory 1006, data storage device 1010 and communication interface 1012, which may communicate with each other via data and control bus 1018. In some examples, computer system 1000 may also include display device 1014 and/or user interface 1016.

Display device 1014 may be any known display technology, including but not limited to display devices using Liquid Crystal Display (LCD) or Light Emitting Diode (LED) technology.

The processing device 1002 may use any known processor technology, including but not limited to graphics processors and multi-core processors. The processing device 1002 may include, without being limited to, a microprocessor, a central processing unit, an application-specific integrated circuit (ASIC), a field programmable gate array (FPGA), a digital signal processor (DSP) and/or a network processor. The processing device 1002 may be configured to execute processing logic 1004 for performing the operations described herein. The processing device 1002 may include a special-purpose processing device specially programmed with processing logic 1004 to perform the operations described herein.

The memory 1006 may include, for example, without being limited to, at least one of a read-only memory (ROM), a random access memory (RAM), a flash memory, a dynamic RAM (DRAM) and a static RAM (SRAM), storing computer-readable instructions 1008 executable by processing device 1002. The memory 1006 may include a non-transitory computer readable storage medium storing computer-readable instructions 1008 executable by processing device 1002 for performing the operations described herein. For example, the computer-readable instructions 1008 may include operations performed by components of the website detection systems 100 and 100'. Although one memory 1006 is illustrated in FIG. 10, in some examples, computer system 1000 may include two or more memory devices (e.g., dynamic memory and static memory).

The user interface 1016 may be any known input device technology, including but not limited to a keyboard (including a virtual keyboard), mouse, track ball, camera, and touch-sensitive pad or display.

The data and control bus 1018 may be any known internal or external bus technology, including but not limited to industry standard architecture (ISA), extended ISA (EISA), peripheral component interconnect (PCI), PCI Express, universal serial bus (USB), Serial advanced technology attachment (ATA) or Fire Wire.

The computer system 1000 may include communication interface 1012, for direct communication with other computers (including wired and/or wireless communication) and/or for communication with a network. In some examples, computer system 1000 may include display device 1014 (e.g., a liquid crystal display (LCD), a touch sensitive display, etc.).

In some examples, the computer system 1000 may include data storage device 1010 storing instructions (e.g., software) for performing any one or more of the functions described herein. Data storage device 1010 may include a non-transitory computer-readable storage medium, including, without being limited to, solid-state memories, optical media and magnetic media.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including, but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

The invention claimed is:

1. A method for searching for and identifying unauthorized websites, the method comprising:
    receiving, by a website detection system comprising a processing device and a memory storing computer-readable instructions, a plurality of domains from one or more data providers via a communications network;
    combining, by the website detection system, the plurality of domains into a single list of domains;
    splitting, by the website detection system, the single list of domains into a plurality of portions corresponding to a number of nodes;
    extracting, by the website detection system, Hypertext Markup Language ("HTML") source code from each domain of the plurality of domains, wherein the extracting is performed in parallel by each node of the number of nodes on a corresponding portion of the plurality of portions via a parallel Hypertext Transfer Protocol/Hypertext Transfer Protocol Secure ("http/https") data transfer application;
    storing, by the website detection system, the extracted HTML source code as website data in a website data database;
    comparing, by the website detection system, the website data to template data of known unauthorized sites to determine a level of similarity, the template data stored in a template data database;
    creating, by the website detection system, a list of potentially unauthorized sites based on the comparing;
    storing, by the website detection system, the list of potentially unauthorized sites and associated website data in a potentially unauthorized sites database;
    reviewing, by the website detection system, the list of potentially unauthorized sites and the associated website data to identify one or more unauthorized websites on the list of potentially unauthorized sites; and
    updating, by the website detection system, the template data in the template data database to include the one or more unauthorized websites and the associated website data.

2. The method of claim 1, wherein the comparing of the website data to the template data of the known unauthorized sites comprises one or more of:
    comparing, by a string comparison system of the website detection system, one or more strings in the website data to one or more strings in the template data;
    comparing, by a fuzzy hash comparison system of the website detection system, one or more fuzzy hashes of the website data to one or more fuzzy hashes of the template data; and
    comparing, by a clustering system of the website detection system, one or more clusters of the website data to one or more clusters of the template data.

3. The method of claim 1, wherein the reviewing of the list of potentially unauthorized sites and the associated website data comprises:
    obtaining, by a screenshot system of the website detection system, one or more screenshots of the websites on the list of potentially unauthorized sites; and
    comparing the one or more screenshots of the websites on the list of potentially unauthorized sites to one or more screenshots of the known unauthorized sites by one or more of:
    comparing a hash of the one or more screenshots to a hash of the one or more screenshots of the known unauthorized sites, and
    identifying an object of interest in the one or more screenshots using one or more artificial intelligence/machine learning models.

4. The method of claim 1, wherein the reviewing of the list of potentially unauthorized sites and the associated website data comprises:
    parsing, by a Document Object Model scraping system, text generated by JavaScript when pulling information from backend databases.

5. The method of claim 1, further comprising:
    searching, by a pivoting system of the website detection system, for additional potentially unauthorized sites using a canonical name of websites on the list of potentially unauthorized sites.

6. The method of claim 1, further comprising:
    searching, by a pivoting system of the website detection system, for additional potentially unauthorized sites using a canonical name of the one or more unauthorized websites.

7. The method of claim 2, wherein the comparing of the one or more fuzzy hashes of the website data to the one or more fuzzy hashes of the template data comprises:
    generating one or more SSDeep hashes of files within the website data;
    using one or more data comparison tools to compare the one or more SSDeep hashes of files within the website data to one or more SSDeep hashes of files within the template data; and
    calculating a Levenshtein distance between the one or more SSDeep hashes of files within the website data to one or more SSDeep hashes of files within the template data.

8. The method of claim 2, wherein the comparing of the one or more clusters of the website data to the one or more clusters of the template data comprises using one or more visual processing algorithms to calculate a locus of similar files.

9. The method of claim 3, wherein the one or more artificial intelligence/machine learning models comprise an object detection model that is trained on the one or more screenshots of the known unauthorized sites.

10. A website detection system comprising:
a processing device operatively coupled to a memory storing computer-readable instructions that, when executed by the processing device, cause the processing device to:
receive a plurality of domains from one or more data providers via a communications network;
combine the plurality of domains into a single list of domains;
split the single list of domains into a plurality of portions corresponding to a number of nodes;
extract Hypertext Markup Language ("HTML") source code from each domain of the plurality of domains, wherein the extracting is performed in parallel by each node of the number of nodes on a corresponding portion of the plurality of portions via a parallel Hypertext Transfer Protocol/Hypertext Transfer Protocol Secure ("http/https") data transfer application;
store the extracted HTML source code as website data in a website data database;
compare the website data to template data of known unauthorized sites to determine a level of similarity, the template data stored in a template data database;
create a list of potentially unauthorized sites based on the comparing;
store the list of potentially unauthorized sites and associated website data in a potentially unauthorized sites database;
review the list of potentially unauthorized sites and the associated website data to identify one or more unauthorized websites on the list of potentially unauthorized sites; and
update the template data in the template data database to include the one or more unauthorized websites and the associated website data.

11. The system of claim 10, wherein the website detection system is configured to compare the website data to template data of known unauthorized sites by one or more of:
comparing, by a string comparison system, one or more strings in the website data to one or more strings in the template data;
comparing, by a fuzzy hash comparison system, one or more fuzzy hashes of the website data to one or more fuzzy hashes of the template data; and
comparing, by a clustering system, one or more clusters of the website data to one or more clusters of the template data.

12. The system of claim 10, wherein the website detection system is configured to review the list of potentially unauthorized sites and the associated website data by:
obtaining, by a screenshot system of the website detection system, one or more screenshots of the websites on the list of potentially unauthorized sites; and
comparing the one or more screenshots of the websites on the list of potentially unauthorized sites to one or more screenshots of the known unauthorized sites by one or more of:
comparing a hash of the one or more screenshots to a hash of the one or more screenshots of the known unauthorized sites, and
identifying an object of interest in the one or more screenshots using one or more artificial intelligence/machine learning models.

13. The system of claim 10, wherein the website detection system is configured to review the list of potentially unauthorized sites and the associated website data by:
parsing, by a Document Object Model scraping system, text generated by JavaScript when pulling information from backend databases.

14. The system of claim 10, wherein the website detection system is configured to:
search, by a pivoting system, for additional potentially unauthorized sites using a canonical name of websites on the list of potentially unauthorized sites.

15. The system of claim 10, wherein the website detection system is configured to:
search, by a pivoting system, for additional potentially unauthorized sites using a canonical name of the one or more unauthorized websites.

16. The system of claim 11, wherein the fuzzy hash comparison system is configured to compare the one or more fuzzy hashes of the website data to the one or more fuzzy hashes of the template data by:
generating one or more SSDeep hashes of files within the website data;
using one or more data comparison tools to compare the one or more SSDeep hashes of files within the website data to one or more SSDeep hashes of files within the template data; and
calculating a Levenshtein distance between the one or more SSDeep hashes of files within the website data to one or more SSDeep hashes of files within the template data.

17. The system of claim 11, wherein the clustering system is configured to compare the one or more clusters of the website data to the one or more clusters of the template data by using one or more visual processing algorithms to calculate a locus of similar files.

18. The system of claim 12, wherein the one or more artificial intelligence/machine learning models comprise an object detection model that is trained on the one or more screenshots of the known unauthorized sites.

19. A non-transitory computer readable storage medium storing one or programs comprising computer-readable instructions that, when executed by a processing device of a data distribution system, cause the processing device to perform the functions of:
receiving a plurality of domains from one or more data providers via a communications network;
combining the plurality of domains into a single list of domains;
splitting the single list of domains into a plurality of portions corresponding to a number of nodes;
extracting Hypertext Markup Language ("HTML") source code from each domain of the plurality of domains, wherein the extracting is performed in parallel by each node of the number of nodes on a corresponding portion of the plurality of portions via a parallel Hypertext Transfer Protocol/Hypertext Transfer Protocol Secure ("http/https") data transfer application;
storing the extracted HTML source code as website data in a website data database;
comparing the website data to template data of known unauthorized sites to determine a level of similarity, the template data stored in a template data database;
creating a list of potentially unauthorized sites based on the comparing;

storing the list of potentially unauthorized sites and associated website data in a potentially unauthorized sites database;

reviewing the list of potentially unauthorized sites and the associated website data to identify one or more unauthorized websites on the list of potentially unauthorized sites; and updating the template data in the template data database to include the one or more unauthorized websites and the associated website data.

20. The non-transitory computer readable storage medium of claim 19, wherein the comparing of the website data to the template data of known unauthorized sites comprises one or more of:

comparing one or more strings in the website data to one or more strings in the template data;

comparing one or more fuzzy hashes of the website data to one or more fuzzy hashes of the template data; and comparing one or more clusters of the website data to one or more clusters of the template data.

21. The non-transitory computer readable storage medium of claim 19, wherein the reviewing of the list of potentially unauthorized sites and the associated website data comprises:

obtaining one or more screenshots of the websites on the list of potentially unauthorized sites; and comparing the one or more screenshots of the websites on the list of potentially unauthorized sites to one or more screenshots of the known unauthorized sites by one or more of:

comparing a hash of the one or more screenshots to a hash of the one or more screenshots of the known unauthorized sites, and identifying an object of interest in the one or more screenshots using one or more artificial intelligence/machine learning models.

22. The non-transitory computer readable storage medium of claim 19, wherein the reviewing of the list of potentially unauthorized sites and the associated website data comprises:

parsing text generated by JavaScript when pulling information from backend databases.

23. The non-transitory computer readable storage medium of claim 19, wherein the computer-readable instructions, when executed by the processing device, further cause the processing device to:

search for additional potentially unauthorized sites using a canonical name of websites on the list of potentially unauthorized sites.

24. The non-transitory computer readable storage medium of claim 19, wherein the computer-readable instructions, when executed by the processing device, further cause the processing device to:

search for additional potentially unauthorized sites using a canonical name of the one or more unauthorized websites.

25. The non-transitory computer readable storage medium of claim 20, wherein the comparing of the one or more fuzzy hashes of the website data to the one or more fuzzy hashes of the template data comprises:

generating one or more SSDeep hashes of files within the website data;

using one or more data comparison tools to compare the one or more SSDeep hashes of files within the website data to one or more SSDeep hashes of files within the template data; and calculating a Levenshtein distance between the one or more SSDeep hashes of files within the website data to one or more SSDeep hashes of files within the template data.

26. The non-transitory computer readable storage medium of claim 20, wherein the comparing of the one or more clusters of the website data to the one or more clusters of the template data comprises using one or more visual processing algorithms to calculate a locus of similar files.

27. The non-transitory computer readable storage medium of claim 21, wherein the one or more artificial intelligence/machine learning models comprise an object detection model that is trained on the one or more screenshots of the known unauthorized sites.

* * * * *